US009913459B2

(12) United States Patent
Keller (10) Patent No.: US 9,913,459 B2
(45) Date of Patent: Mar. 13, 2018

(54) METHOD OF AFFIXING AN OVERFLOW SYSTEM TO AN AQUARIUM TANK

(71) Applicant: Adam John Keller, Neenah, WI (US)

(72) Inventor: Adam John Keller, Neenah, WI (US)

(73) Assignee: Adam John Keller, Neenah, WI (US)

( * ) Notice: Subject to any disclaimer, the term of this patent is extended or adjusted under 35 U.S.C. 154(b) by 0 days.

(21) Appl. No.: 15/641,096

(22) Filed: Jul. 3, 2017

(65) Prior Publication Data

US 2017/0295760 A1  Oct. 19, 2017

Related U.S. Application Data

(62) Division of application No. 14/615,908, filed on Feb. 6, 2015, now Pat. No. 9,737,058.

(51) Int. Cl.
*A01K 63/04* (2006.01)
*A01K 63/00* (2017.01)

(52) U.S. Cl.
CPC ................. *A01K 63/006* (2013.01)

(58) Field of Classification Search
CPC .... A01K 63/006; A01K 63/04; A01K 63/045; A01K 63/00; A01K 63/003
USPC ....... 119/259, 247, 260, 245, 246, 251, 269; 137/571, 575, 577, 577.5; 210/167.21, 210/167.27
See application file for complete search history.

*Primary Examiner* — Trinh T Nguyen
(74) *Attorney, Agent, or Firm* — Thomas J. Connelly; Northwind IP Law, S.C.

(57) ABSTRACT

A method of affixing an overflow system to an aquarium is disclosed. The aquarium has a bottom, at least one sidewall, an open top surrounded by a top edge, and a frame having a bottom edge. The method includes positioning an overflow device in the aquarium. The overflow device has a front wall, a back wall, a first sidewall and a second sidewall all secured to a bottom wall and extending upward therefrom to create a chamber having an open top. The front wall, the back wall, and the first and second sidewalls all have a plurality of slots formed therethrough which are configured to receive water from the aquarium into the chamber, and the bottom wall has an enlarged aperture formed therethrough. A first aperture is formed through the sidewall of the aquarium and an attachment mechanism is used to attach the enlarged aperture to the first aperture.

20 Claims, 4 Drawing Sheets

METHOD OF AFFIXING AN OVERFLOW SYSTEM TO AN AQUARIUM TANK

CROSS REFERENCE TO RELATED APPLICATIONS

This application is a divisional under 35 U.S.C. § 120 of pending U.S. application Ser. No. 14/615,908, filed Feb. 6, 2015 and now published as US2016/0227748 A1, which is incorporated herein by reference.

FIELD OF THE INVENTION

This invention relates to a method of affixing an overflow system to an aquarium tank.

BACKGROUND OF THE INVENTION

Today, there are many different applications where it is necessary to drain fluid from a tank for various purposes. In many commercial, industrial, municipal and residential applications and processes, a fluid, either a liquid or a gas, needs to be drained. The kind of fluid can vary. The fluid can be but is not limited to: fresh water, salt water, brine, an aqueous mixture, a chemical, a food mixture, a liquid mixture, milk, a juice, a soft drink, an alcohol, etc. Many municipalities have water treatment plants that collect and treat drinking water, storm water, waste streams, etc. Many homes and some small businesses have a fresh water and/or a salt water aquarium. Aquariums are manufactured in various sizes from 10 gallons to 1,500 gallons or more. Regardless of the size of the aquarium, all aquariums need the water filtered at some time. Desirably, the water in an aquarium is filtered on a continuous basis. Some aquariums, especially aquariums that can hold a large quantity of fluid, continuously drain off some of the water and route it to a sump system where it is filtered and then returned to the aquarium.

In some of the above mentioned applications and processes, a portion of the fluid is removed from a tank or an aquarium and is routed to another tank where it is further processed. Sometimes the fluid is filtered. A fluid can be filtered to remove foreign particles, debris and/or waste. The clean, filtered fluid can then be reintroduced back into the original tank or aquarium. In other processes, it may be necessary to drain excess fluid from a tank in order to prevent a flood.

A home aquarium is a good example of an application where water may be continuously drained and routed to a filtering system. The filtering system can be hidden from view. Water in the fish aquarium will becomes tainted with food particles, algae growth, fish waste, etc. over time. A portion of this water is skimmed or drained off from the upper surface of the water in the aquarium and is routed to a filtering system which is usually situated in a cabinet located below the aquarium or on lower level, such as in the basement. The filtering system can vary in design and construction. Such aquariums need an overflow system which is easy to install and is desirably out of sight so as not to interfere with the aesthetics of the aquarium.

Now, a method of affixing an overflow system to an aquarium tank has been invented. The overflow system is especially useful for a fish aquarium. The overflow system is sized to fit between a lid on the aquarium and a bottom edge of the aquarium frame so as to be out of sight of the people looking at the fish in the aquarium.

SUMMARY OF THE INVENTION

Briefly, this invention relates to a method of affixing an overflow system to an aquarium tank. The aquarium tank has an open top with a top edge, at least one sidewall, a frame extending downward from the top edge along the at least one sidewall and has a bottom edge. A lid closes off the open top of the aquarium tank. The method includes the steps of positioning an overflow device in the aquarium tank between the lid and the bottom edge of the frame. The overflow device has a front wall, a back wall, a first sidewall and a second sidewall. All four walls are secured to a bottom wall and extend upward therefrom to create a chamber having an open top. The front wall, the back wall, and the first and second sidewalls have a plurality of slots formed therethrough. A portion of the plurality of slots is disposed below the water line of the aquarium tank so as to receive water from the aquarium tank into the chamber. The bottom wall has an enlarged aperture formed therethrough. The method also includes forming a first aperture through the sidewall of the aquarium tank. The first aperture is positioned below the bottom edge of the horizontal member. The method further includes using an attachment mechanism to attach the enlarged aperture formed in the bottom wall of the overflow device to the first aperture formed in the sidewall of the aquarium tank, with a portion of the attachment mechanism passing through the first aperture.

The general object of this invention is to provide a method of affixing an overflow system to an aquarium tank. A more specific object of this invention is to provide a method of affixing an overflow system to an aquarium tank at various orientations.

Another object of this invention is to provide a method of affixing an overflow system to an aquarium tank using an overflow device which has been injection molded.

A further object of this invention is to provide a method of affixing an overflow system to an aquarium tank such that the overflow system is out of sight.

Still another object of this invention is to provide a method of affixing an overflow system to an aquarium tank which is easy to install.

Still further, an object of this invention is to provide a method of affixing an overflow system to an aquarium tank which is relatively inexpensive.

Other objects and advantages of the present invention will become more apparent to those skilled in the art in view of the following description and the accompanying drawings.

DETAILED DESCRIPTION OF THE INVENTION

Figure 1:
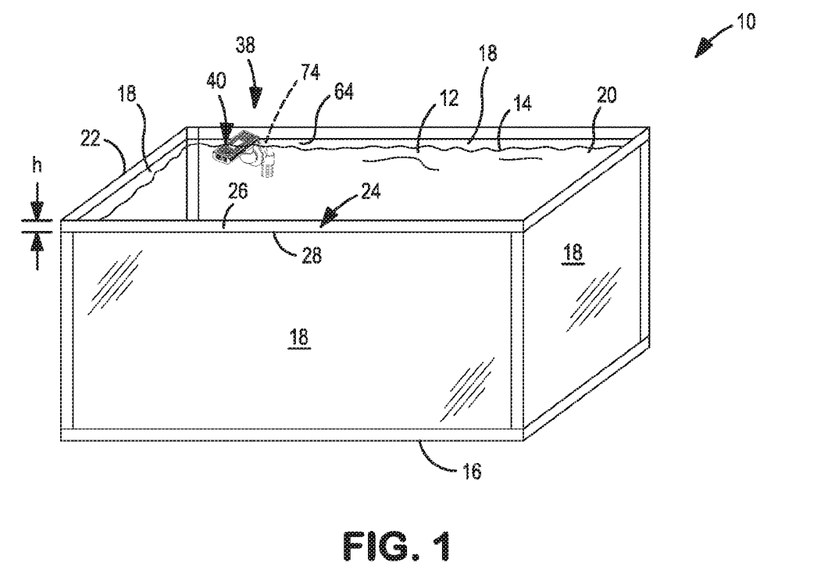
FIG. 1 is a perspective view of an aquarium tank having an overflow system.

Referring to FIG. 1, a tank 10 is shown which is capable of holding a quantity of fluid 12. The tank 10 can vary in size, shape and configuration. The fluid 12 can vary and can be almost any liquid or gas. By "fluid" it is meant a continuous amorphous substance whose molecules move freely past one another and that assumes the shape of its container: a liquid or a gas. The fluid 12 can be but is not limited to: fresh water, salt water, brine, an aqueous mixture, a chemical, a food mixture, a liquid mixture, a gas, milk, a juice, a soft drink, an alcohol, etc. By "brine" it is meant water saturated with or containing large amounts of a salt, especially sodium chloride; the water of a sea or an ocean.

The tank 10 can be used in various commercial, industrial, municipal and residential applications and processes. The tank 10 can be used for various purposes. For example, the tank 10 could be a holding tank for rain water, it could be holding vessel for making a liquid product, it could be a waste treatment container, it could be a fish aquarium used to house one or more kinds of fish or some other aquatic animal, plant, coral, etc. By "coral" it is meant a rocklike deposit consisting of the calcareous skeletons secreted by various anthozoans and often accumulating to form reefs or islands in warm seas.

For simplicity, this invention will be explained with the tank 10 being an aquarium. By "aquarium" it is meant a water-filled enclosure in which living fish or other aquatic animals and/or plants are kept. Aquariums, sometimes referred to as aquarium tanks, are commercially sold in various sizes and shapes. Aquariums can hold from 10 gallons of water up to 1,500 gallons or more. The water can be fresh water or salt water.

Still referring to FIG. 1, the aquarium tank 10 is depicted as a rectangular shaped container capable of holding a quantity of fluid 12. The fluid 12 establishes a fluid (water) line 14 within the aquarium tank 10. The fluid (water) line 14 is the upper surface of fluid (water) in the aquarium tank 10. The aquarium tank 10 can be formed from various materials. Glass is the preferred material from which to construct the aquarium tank 10. However, other materials can also be used especially when the tank 10 is used for some other type of commercial or industrial application. Such other materials can include but are not limited to: an acrylic, a plastic, a thermoplastic, metal or a metal alloy, steel or a steel alloy, stainless steel, galvanized steel, aluminum, tin, copper, a composite, etc.

The aquarium tank 10 can be an integral member. By "integral" it is meant a complete unit, a whole. The aquarium tank 10 can be constructed in any manner known to those skilled in the art. For example, the aquarium tank 10 can be assembled from individual pieces of glass. The various pieces of glass can be adhesively secured together. In addition, a frame can be used to add stability to the glass.

The aquarium tank 10 can be formed from clear glass. The glass can vary in thickness. The thickness of the glass can range from about 0.125 inches up to about 1 inch. Desirably, the thickness of the glass is from between about 0.25 inches to about 0.75 inchers. More desirably, the glass has a thickness of about 0.5 inches. The aquarium tank 10 includes a bottom 16 and one or more sidewalls 18 which are secured to the bottom 16. Four sidewalls 18, 18, 18 and 18 are depicted in FIG. 1. However, if the aquarium tank 10 had a cylindrical shape, it would have a single sidewall 18. The aquarium tank 10 has an open top 20 surrounded by a top edge 22. The aquarium tank 10 also has a frame 24 which can include several members secured together. The frame 24 provides support for the sidewalls 18, 18, 18 and 18 of the aquarium tank 10. The frame 24 can be formed on the inside or outside of the aquarium tank 10. The frame 24 can be constructed from various materials. Desirably, the frame 24 is a marine grade anodized aluminum frame. The anodized frame 24 creates a hardened surface that will not rust, corrode or oxidize. The frame 24 can also be formed from plastic.

The frame 24 includes a horizontal member 26 which is positioned adjacent to the top edge 22 of the aquarium tank 10. The horizontal member 26 extends downward along a portion of one of the sidewalls 18, 18, 18 and 18. The horizontal member 26 also has a bottom edge 28. The horizontal member 26 has a height h measured perpendicular to the bottom edge 28. The height h of the horizontal member 26 can vary. The height h of the horizontal member 26 can be about 3 inches or less. Desirably, the height h of the horizontal member 26 is less than about 2.5 inches. More desirably, the height h of the horizontal member 26 is less than about 2 inches. Even more desirably, the height h of the horizontal member 26 is less than about 1.75 inches. Most desirably, the height h of the horizontal member 26 is less than about 1.5 inches. The horizontal member 26 hides from site any device located within the height h of the horizontal member 26. Therefore, if a person is viewing the fish in the aquarium tank 10, any device located above the bottom edge 28 of the horizontal member 26 would be out of site.

Figure 2:
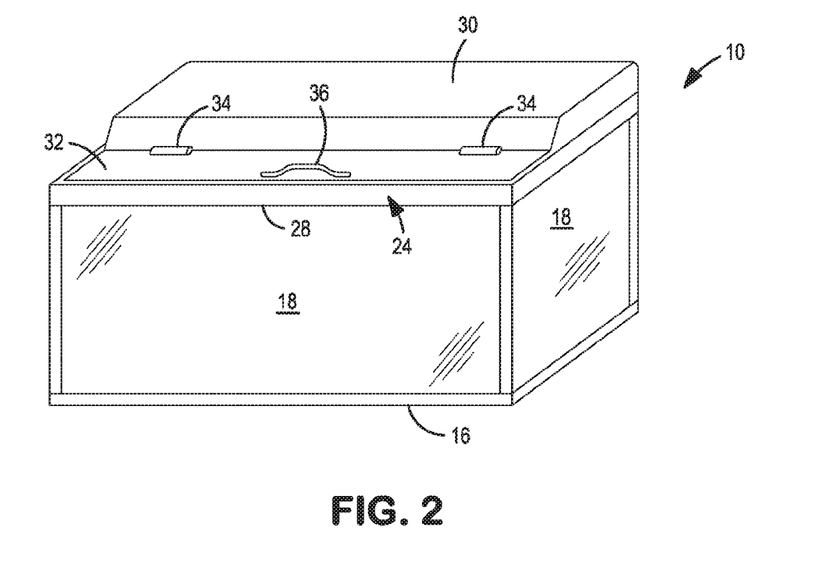
FIG. 2 is a perspective view of the aquarium tank shown in FIG. 1 including a lid.

Referring now to FIG. 2, the aquarium tank 10 is shown having a lid 30 which closes off the open top 20 of the aquarium tank 10. The lid 30 can optionally include a light (not shown) which can illuminate the aquarium tank 10. The light can be turned on during the day and/or the night. The lid 30 functions to limit or prevent evaporation of water from the aquarium tank 10. The lid 30 also functions to limit entry or exit into or out of the aquarium tank 10. This is beneficial in keeping the fish in the aquarium tank 10 and preventing foreign objects from entering the aquarium tank 10. The lid 30 can optionally include a movable member 32 which can be joined to the remainder of the lid 30 by one or more hinges 34. A pair of hinges 34, 34 is shown in FIG. 2. The movable member 32 can pivot on the pair of hinges 34, 34. The movable member 32 may optionally include a handle 36. The handle 36 provides a convenient way of moving the movable member 32 from a closed position to an open position. With the movable member 32 in its open position, additional fish, fish food, extra water, rocks, gravel, etc. can be added to the aquarium tank 10. Likewise, one can also remove fish or other items from the aquarium tank 10 when the movable member 32 is in its open position.

Figures 3, 4:
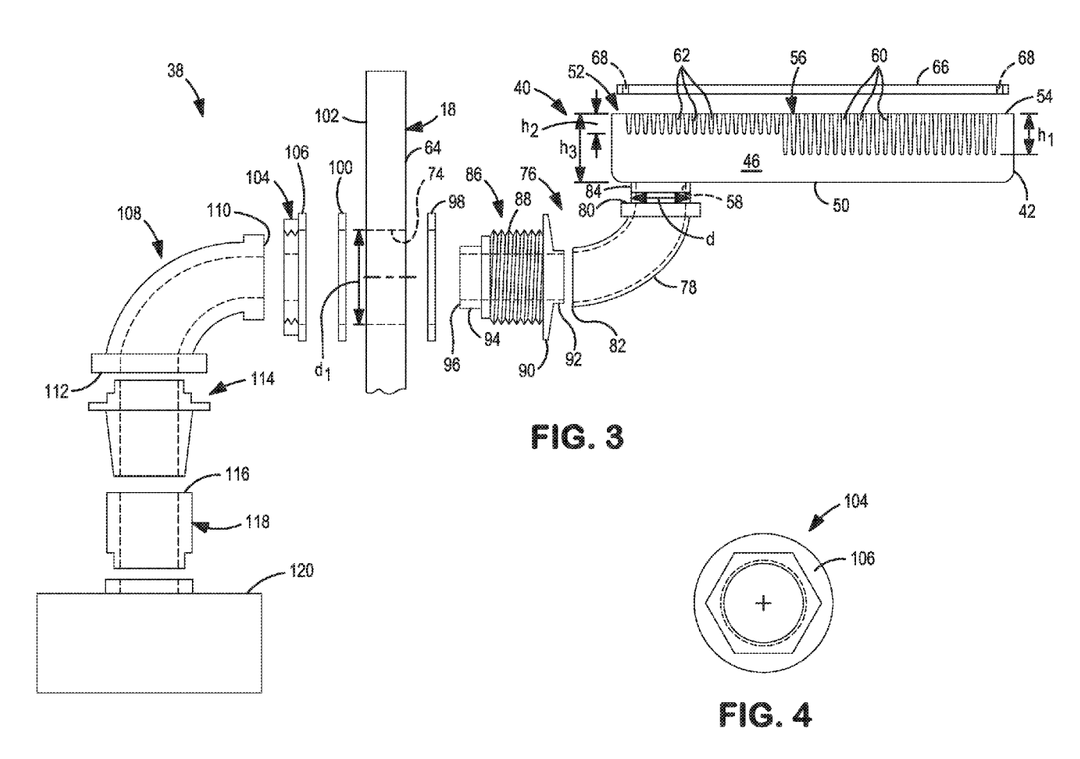
FIG. 3 is an exploded side view of the overflow system.
FIG. 4 is an end view of the nut shown in FIG. 3.

Referring now to FIGS. 1 and 3, an overflow system 38 is shown which can be used with the aquarium tank 10. The overflow system 38 regulates the amount of fluid (water) 12 allowed to exit the aquarium tank 10. The amount of fluid (water) 12 introduced into the aquarium tank 10 and the amount of fluid (water) 12 withdrawn from the aquarium tank 10 will establish a flow rate for the overflow system 38. The overflow system 38 can handle various flow rates. For example, the overflow system 38 can be designed to handle a flow rate of up to 2,500 gallons per hour.

The overflow system 38 includes an overflow device 40 that can vary in size, shape and configuration. The overflow device 40 is shown as having an elongated, rectangular configuration. However, any geometrical configuration can be used including a semi-tubular shape. The overflow device 40 can be constructed from various materials and can be formed using various methods known to those skilled in the art. Desirably, the overflow device 40 is formed from a plastic, a thermoplastic or a composite material since these materials are relatively easy to mold and will not rust or corrode. The overflow device 40 can be injection molded. Injection molding is a very economical way to construct the overflow device 40.

The overflow device 40 is positioned so the fluid (water) line 14 in the aquarium tank 10 is located above the bottom edge 28 of the horizontal member 26 of the frame 24. In this position, one will not see an unsightly fluid (water) line 14 as water evaporates from the aquarium tank 10 yet the fluid (water) line 14 will be below the lid 30 so excessive evaporation does not occur.

Referring now to FIGS. 3 and 5-10, the overflow device 40 has a front wall 42, a back wall 44, a first sidewall 46 and a second sidewall 48. The walls 42, 44 and 46 can be linear or arcuate in shape. All four walls 42, 44, 46 and 48 are secured to a bottom wall 50. The front wall 42, the back wall 44 and the first and second sidewalls, 46 and 48 respectively, extend upward from the bottom wall 50 to create a chamber 52 having an open top 54. Each of the front wall 42, the back wall 44 and the first and second sidewalls, 46 and 48 respectively, have a plurality of slots 56 formed therethrough. By "slot" it is meant a narrow opening; slit. Each of the plurality of slots 56 can be tapered so as to lessen or minimize the risk of becoming clogged with debris. The taper can be a V-shaped configuration which is wider at the top. If one wished to shape the plurality of slots 56 to have parallel sides, this is also possible, but slots with parallel sides are more likely to become clogged than tapered slots 56.

The unique slot design lets larger and larger particles pass through the plurality of slots 56 as the flow rate into the aquarium tank 10 increases or as the lower portions of the plurality of slots 56 become clogged with particles. The lower portion of each of the plurality of slots 56 is small enough to prevent even small food pellets from making their way through the overflow device 40. However, if particulates build up, eventually the openings of the plurality of slots 56 get wider. This means that as the water level rises and moves vertically up the height of the overflow device 40, more fluid (water) 12 can exit the aquarium tank 10. This is an automatic built in safeguard against clogging. In the event that a major amount of debris would clog all of the plurality of slots 56, the open top 54 of the overflow device 40 has much larger openings that would allow the larger debris and a lot of fluid (water) 12 to flow into the overflow device 40. However, the open top 54 of the overflow device 40 can optionally includes a top screen 66 that would not let debris, snails or fish through that are large enough to create a clog further downstream in the overflow system 38.

The plurality of tapered slots 56 automatically allows for an exponential amount of additional skimming capacity as the flow rate into the aquarium tank 10 increases. A lower flow rate means smaller, finer streams of water flowing through the plurality of tapered slots 56 into the overflow device 40. Higher flow rates make exponentially larger, higher volumes of fluid (water) 12 flowing into the overflow device 40. This means the overflow device 40 will optimize the most efficient amount of aeration and provide for a quiet flow automatically, even when there are drastically different flow levels into the aquarium tank 10.

Referring again to FIG. 1, the overflow device 40 is shown being positioned in the aquarium tank 10 with the back wall 44 aligned parallel to an inside surface 64 of one of the four sidewalls 18, 18, 18 and 18. However, the orientation of the overflow device 40 can be adjusted, as will be explained later.

Referring again to FIGS. 9 and 10, the overflow device 40 is positioned within the aquarium tank 10 so that a portion of the plurality of slots 56 is disposed below the fluid (water) line 14. This position allows fluid (water) 12 from the aquarium tank 10 to flow into the chamber 52. The chamber 52 receives the fluid (water) 12 from the aquarium tank 10. The overflow device 40 also has an enlarged aperture 58 formed through the bottom wall 50. The enlarged aperture 58 has a diameter d. The diameter d can vary in size. Desirably, the diameter d of the enlarged aperture 58 is about 1 inch or more. More desirably, the diameter d of the enlarged aperture 58 is about 1.25 inches or more. Even more desirably, the diameter d of the enlarged aperture 58 is about 1.5 inches or more. For larger aquariums, the diameter d of the enlarged aperture 58 can be about 2 inches. The diameter d of the enlarged aperture 58 can even be 3 inches or more.

Referring again to FIGS. 3, 9 and 10, one can clearly see that the plurality of slots 56 include a first set of slots 60 having a height $h_1$ and a second set of slots 62 having a smaller height $h_2$. Desirably, the height $h_1$ of each of the first slots 60 is about 0.5 inches or more. More desirably, the height $h_1$ of each of the first slots 60 is about 0.6 inches or more. Even more desirably, the height $h_1$ of each of the first slots 60 is about 0.75 inches. The height $h_2$ of each of the second slots 62 is about 0.50 inches or less. Desirably, the height $h_2$ of each of the second slots 62 is about ⅓ less than the height $h_1$ of each of the first slots 60.

Figure 9:
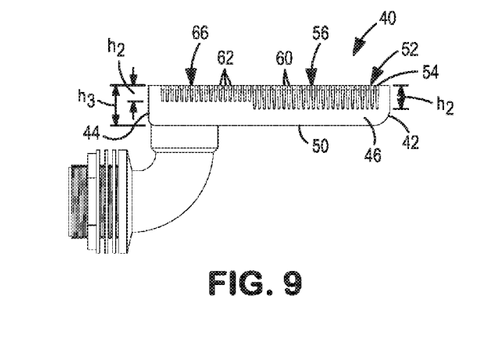
FIG. 9 is a side view of the overflow device showing a plurality of first and second tapered slots having different height dimensions.
Figure 10:
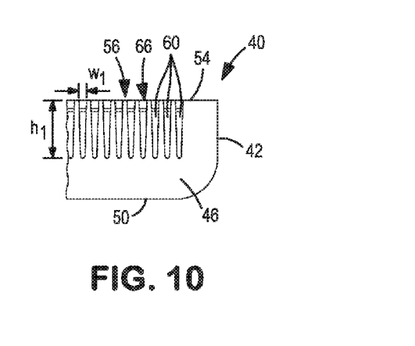
FIG. 10 is an enlarged side view of a portion of the overflow device shown in FIG. 9 depicting the plurality of tapered slots.

Each of the first and second sets of slots, 60 and 62 respectively, are tapered to have an approximately V-shape profile. The tapered profile narrows from a wide dimension, located at the open top 54 of the overflow device 40, to a narrow dimension, located down and away from the open top 54 of the overflow device 40. Each of the first and second sets of slots, 60 and 62 respectively, has a maximum width, $w_1$ and $w_2$ respectively, which occurs adjacent to the open top 54 of the overflow device 40. Each of the first and second sets of slots, 60 and 62 respectively, taper downward to a narrow dimension as one approaches the bottom of each of the first and second sets of slots, 60 and 62 respectively. The first and second sets of slots, 60 and 62 respectively, are similar in appearance except that each of the first set of slots 60 has a greater height $h_1$ and therefore have a narrower opening adjacent to the bottom of each taper. As mentioned above, the tapered design minimizes the chance that the plurality of slots 56 will become clogged with debris for as the fluid (water) level in the aquarium tank 10 rises, each taper creates a larger opening for the fluid (water) to flow through.

It should be understood that other geometrical shapes for the first and second sets of slots, 60 and 62, could also be utilized.

Each of the plurality of slots 56 taper downward from the open top 54 of the overflow device 40. This means that the width $w_1$ and $w_2$ of the first and second sets of slots, 60 and 62 respectively, constantly varies along its height $h_1$ or $h_2$. At the open top 54 of the overflow device 40, the width $w_1$ is equal to the width $w_2$.

Still referring to FIGS. 3, 9 and 10, the plurality of slots 56 formed through each of the first and second sidewalls, 46 and 48 respectively, includes a plurality of a first set of slots 60 and a plurality of a second set of slots 62. The number of slots 56 present in each of the first and second sidewalls, 46 and 48 respectively, can vary. Typically, there are five (5) or more of the first and second slots, 60 and 62 respectively, per inch. Desirably, there are six (6) or more of the first and second slots, 60 and 62 respectively, per inch. As clearly shown in FIG. 3, the first set of slots 60 are located closer to the front wall 42 and the second set of slots 62 are located closer to the back wall 44. The reason for this is that the enlarged aperture 58 is aligned closer to the back wall 44. All the fluid (water) 12 that enters the chamber 52 has to exit through the enlarged aperture 58. By forming the shorter, second set of slots 62 adjacent to the enlarged aperture 58, one will be able to better control the direction of flow of fluid (water) 12 through the chamber 52. If an increase flow rate is needed, the fluid (water) 12 entering through the second set of slots 62 will cascade downward close to the enlarged aperture 58 and will exit the chamber 52 almost immediately.

As mentioned above, the number of first and second slots, 60 and 62 respectively, formed in each of the first and second sidewalls, 46 and 48 respectively, can vary. Usually, there is a greater number of first slots 60 than second slots 62. However, this arrangement can be changed, if desired. Desirably, the first set of slots 60 extend over a greater distance of each of the first and second sidewalls, 46 and 48 respectively. For example, for first and second sidewalls, 46 and 48 respectively, each having a length of about 8 inches, the first set of slots 60 can extend along about half or 4 inches of the 8 inch length, while the second set of slots 62 extend along about 0.375 or 3 inches of the 8 inch length. Again, this set up can be changed, if desired. It is also advantageous for the first and second sets of slots, 60 and 62 respectively, to form a continuous pattern without any breaks or interruptions. However, one could certainly, provide a gap or break between the first and second sets of slots, 60 and 62 respectively, if one desired to do so. Likewise, one could provide a space or gap between the first set of slots 60 and/or between the second set of slots 62. As depicted in FIG. 9, there are twenty-six (26) of the first set of slots 60 and nineteen (19) of the second set of slots 62 formed in each of the first and second sidewall, 46 and 48 respectively, and each of the first and second sidewalls, 46 and 48 respectively, has a length of about 8 inches.

The presence of the first and second sets of slots, 60 and 62 respectively, create a stepped profile in each of the first and second sidewalls, 46 and 48 respectively. This stepped profile is for functional purposes and not for aesthetics. The overflow device 40 is positioned in the aquarium tank 10 such that the first set of slots 60 are below the fluid (water) line 14 while the second set of slots 62 are located above the fluid (water) line 14. This means that as the fluid (water) 12 level in the aquarium tank 10 rises, additional slots 62 will become available to allow the fluid (water) 12 to exit the aquarium tank 10. Applicant is unaware of anyone else in the industry that uses such a unique stepped profile.

Referring again to FIG. 6, the front wall 42 contains a plurality of the first set of slots 60. Each of the first set of slots 62 has the larger height $h_1$ dimension. The front wall 42 is shown having a width of about 2.5 inches. For this width, about 1.75 inches contains the first set of slots 60. Desirably, there are 8 or more first slots 60 formed in the front wall 42. More desirably, there are 10 or more first slots 60 formed in the front wall 42. Even more desirably, there are 11 or more first slots 60 formed in the front wall 42. The back wall 44 contains a plurality of the second set of slots 62. Each of the second set of slots 62 has the smaller height $h_2$ dimension. The back wall 44 is shown having a width of about 2.5 inches. For this width, about 1.75 inches contains the second set of slots 62. Desirably, there are 8 or more second slots 62 formed in the back wall 44. More desirably, there are 10 or more second slots 62 formed in the back wall 44. Even more desirably, there are 11 or more second slots 62 formed in the back wall 44. The back wall 44 contains the shorter second set of slots 62 for the same reason the first and second sidewalls, 46 and 48 respectively, contains the shorter second set of slots 62, that being that the back wall 44 is located close to the enlarged aperture 58.

Referring again to FIG. 3, one can see that the overflow device 40 has a narrow profile with a height $h_3$. The height $h_3$ can vary. Desirably, the height $h_3$ of the overflow device 40 is about 1.75 inches or less. More desirably, the height $h_3$ of the overflow device 40 is about 1.6 inches or less. Even more desirably, the height $h_3$ of the overflow device 40 is about 1.5 inches or less. Most desirably, the height $h_3$ of the overflow device 40 is about 1.25 inches. This low or narrow profile allows the overflow device 40 to be positioned in the aquarium tank 10 while being within the height h of the horizontal member 26. The horizontal member 26 will block the overflow device 40 from site. This means that a person looking at the aquarium tank 10 will not be able to see the overflow device 40. This is a unique feature of this overflow system 38 in that it keeps the unsightly overflow device 40 out of site of people looking at the aquarium tank 10. However, in order to accomplish this, the overflow device 40 must have a narrow profile.

Figure 5:
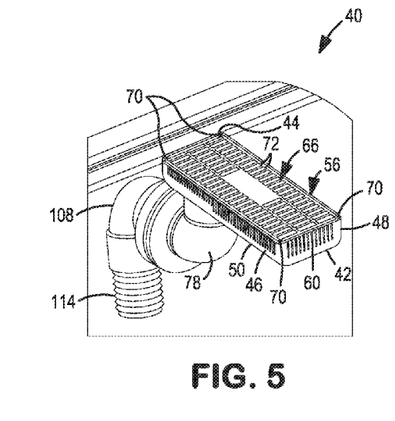
FIG. 5 is a perspective view of the overflow device secured to a first aperture formed in the sidewall of an aquarium tank.
Figure 6:
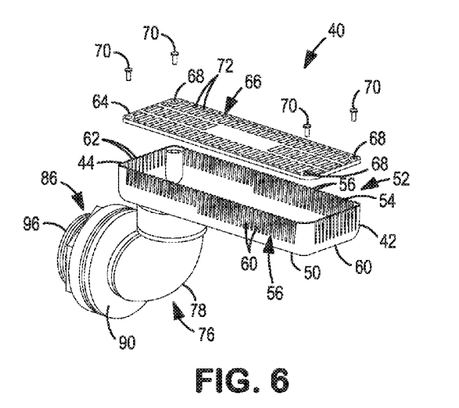
FIG. 6 is a partially exploded view showing the top screen removably attached by screws to the overflow device.

Referring again to FIGS. 3, 5 and 6, the overflow system 38 optionally includes a top screen 66 which is removably attached to the open top 54 of the overflow device 40. The top screen 66 is attached so that it can be removed and cleaned if debris builds up on it. The top screen 66 can be formed from the same material used to construct the overflow device 40 or from a different material. Desirably, the top screen 66 is formed from a plastic or a thermoplastic material which is easy to mold. The top screen 66 could also be formed from a composite material. In FIG. 6, the top screen 66 is shown having four screw holes 68, 68, 68 and 68 formed therethrough. Each of the four screw holes 68, 68, 68 and 68 is located at a corner of the top screen 66. A screw 70 is designed to pass through each of the four screw holes 68, 68, 68 and 68 and secure the top screen 66 to the overflow device 40, see FIG. 6. Other ways of securing the top screen 66 to the overflow device 40 can also be utilized. Such other ways are well known to those skilled in the art.

Referring again to FIGS. 5 and 6, the top screen 66 has a plurality of openings 72 formed therethrough. The plurality of openings 72 can all be of the same size or one or more can differ in size from the remaining apertures 72. Desirably, at least one of the plurality of openings 72 has a smaller surface area than at least one other of the plurality of openings 72 formed in the top screen 66. More desirably, all of the plurality of openings 72 formed through the top screen 66 are not of the same size. The number of openings 72 can vary. The size and shape of each of the plurality of openings 72 can also vary. Circular, square or rectangular openings are the easiest to form. If square or rectangular shaped openings 72 are used, it is easier to mold them with rounded corners versus square corners.

As best depicted in FIG. 6, each of the plurality of openings 72 is rectangular in shape with rounded corners. At a minimum, each of the openings 72 should be about 0.5 inches long and about 0.15 inches wide. Desirably, forty (40) or more openings 72 are formed in the top screen 66. More desirably, fifty (50) or more openings are formed in the top screen 66. Even more desirably, sixty (60) or more openings 72 are formed in the top screen 66. Each of the plurality of openings 72 formed in the top screen 66 has a larger surface area than any one of the plurality of slots 56. This means that each of the plurality of openings 72 forms a larger opening than any of the plurality of slots 56. This is important in order to prevent the aquarium tank 10 from overflowing in case of a malfunction. If fluid (water) 12 can't be withdrawn through the plurality of slots 56 fast enough to compensate for the incoming fluid into the aquarium tank 10, the fluid (water) 12 will flow over the front wall 42, the back wall 44, and over the first and second sidewalls, 46 and 48 respectively, and then flow through the plurality of openings 72 formed in the top screen 66. Since the plurality of openings 72 are larger in size than the slots 56, the fluid (water) 12 will be able to flow out of the aquarium tank 10 at a faster flow rate. This should avoid a flood from occurring. The plurality of openings 72 formed in the top screen 66 serve as the last resort for funneling fluid (water) 12 into the chamber 52 of the overflow device 40. Should debris clog the first and second sets of slots, 60 and 62 respectively, the fluid (water) 12 will flow through the top screen 66 into the chamber 52 and out through the enlarged aperture 58.

It should be noted that many overflow systems, like that taught in U.S. Patent Publication 2009/0250121 do not utilize a top screen 66. However, it has been found that by optionally employing the top screen 66, one can prevent larger size debris from entering the chamber 52 and subsequently finding their way through the enlarged aperture 58. If this occurs, they can cause major problems downstream of the overflow device 40. One does not want large size debris, fish, snails, or other large foreign objects from entering the chamber 52 of the overflow device 40.

Referring again to FIG. 3, the overflow system 38 further includes a first aperture 74 formed through one of the sidewalls 18 of the aquarium tank 10. The configuration of the first aperture 74 can vary but generally it is circular in shape. The first aperture 74 is positioned below the bottom wall 50 of the overflow device 40. Desirably, the bottom wall 50 of the overflow device 40 is positioned at least about 1 inch above the central axis of the first aperture 74. More desirably, the bottom wall 50 of the overflow device 40 is positioned at least about 1.5 inches above the central axis of the first aperture 74. Even more desirably, the bottom wall 50 of the overflow device 40 is positioned at least about 2 inches above the central axis of the first aperture 74. Most desirably, the bottom wall 50 of the overflow device 40 is positioned at least about 2.5 inches above the central axis of the first aperture 74. This means that the central axis of the overflow device 40 is positioned about 4.5 inches or less from the top edge 22 of the aquarium tank 10. Desirably, the central axis of the overflow device 40 is positioned about 4 inches or less from the top edge 22 of the aquarium tank 10.

The first aperture 74 is also positioned below the horizontal member 26 of the frame 24. Desirably, the first aperture 74 is positioned at least about 1 inch below the horizontal member 26 of the frame 24. More desirably, the first aperture 74 is positioned at least about 1.5 inches below the horizontal member 26 of the frame 24.

The first aperture 74 is depicted as a circular opening having a diameter $d_1$. The diameter $d_1$ can vary in dimension. The diameter $d_1$ can be smaller, equal to or be larger than the diameter d of the enlarged aperture 58. Usually, the diameter $d_1$ of the first aperture 74 is larger than the diameter of the enlarged aperture 58 because it may have to accommodate an attachment mechanism 76. Desirably, the diameter $d_1$ of the first aperture 74 is about 1 inch or more. More desirably, the diameter $d_1$ of the first aperture 74 is about 1.5 inches or more. Even more desirably, the diameter $d_1$ of the first aperture 74 is about 2 inches or more.

Still referring to FIG. 3, the overflow system 38 further includes an attachment mechanism 76 for attaching the enlarged aperture 58, formed in the bottom wall 50 of the overflow device 40, to the inside surface 64 of the sidewall 18 of the aquarium tank 10. The attachment mechanism 76 can vary in design and construction. The attachment mechanism 76 can be made from polyvinyl chloride (PVC) components which are readily available in most hardware stores. The polyvinyl chloride (PVC) components are easily assembled and can be adhered together by using an adhesive, glue, chemical binder or a mechanical fastener. A majority of the attachment mechanism 76 is positioned within the aquarium tank 10. A portion of the attachment mechanism 76 passes through the first aperture 74. The attachment mechanism 76 is depicted as including a first elbow 78 having a first end 80 and a second end 82. The first elbow 78 can be a 90° elbow. The first end 80 of the first elbow 78 is secured to a collar 84 which extends downward from the bottom 50 of the overflow device 40. By "collar" it is meant a ring-like device or encircling structure. The collar 84 is aligned with the enlarged aperture 58. This connection can be a rotatable joint which will allow the overflow device 40 to be oriented at different angles relative to the first end 80 of the first elbow 78. More will be mentioned about this later.

The second end 82 of the first elbow 78 is secured to a coupler 86 having a threaded outer surface 88. The threaded outer surface 88 is designed to pass through the first aperture 74 formed in the sidewall 18. The coupler 86 is sometimes referred to as a bulkhead fitting. The coupler 86 has an enlarged shoulder 90, located approximate a first end 92, and an outwardly extending tubular member 94, located at a second end 96. The enlarged shoulder 90 is designed to abut against the inside surface 64 of the sidewall 18. A first washer 98 is positioned between the enlarged shoulder 90 and the inside surface 64 of the sidewall 18 to form a fluid tight seal. The first washer 98 should be formed from a soft pliable material, such as rubber. A second optional washer 100 can be positioned around the threaded outer surface 86 of the coupler 84 after it passes through the first aperture 74. The second washer 100, when present, abuts against an outside surface 102 of the sidewall 18. The second washer 100 should also be formed from a soft pliable material, such as rubber. A nut 104, see FIG. 4, having an enlarged shoulder 106, is threaded onto the threaded outer surface 88 of the coupler 86. As the nut 104 is tightened on the threaded outer surface 88, the first and second washers, 98 and 100 respectively, will form a tight seal against the inside and outside surfaces, 64 and 102 respectively, of the sidewall 18 and prevent any fluid (water) 12 from leaking out. The nut 104 can be formed from the same material as the coupler 86.

It should be understood that only a portion of the attachment mechanism 76 passes through the first aperture 74.

Referring again to FIGS. 3, 5 and 7, the attachment mechanism 76 can optionally include a second elbow 108. The second elbow 108 can be a 90° elbow. The second elbow 108 has a first end 110 and a second end 112. The first end 110 is secured to the second end 96 of the coupler 76. An adhesive, glue, chemical binder or mechanical mechanism can be used to hold the two ends, 110 and 96, permanently together. The second end 112 of the second elbow 108 is secured to a second coupler 114. The second coupler 114 can, in turn, be secured to a first end 116 of a conduit 118. The conduit 118 connects the attachment mechanism 76 to a second tank 120 whereby fluid (water) 12 can be drained from the aquarium tank 10 to the second tank 120. The second tank 120 can be a sump tank which is part of a filtering system for the aquarium tank 10.

Figure 7:
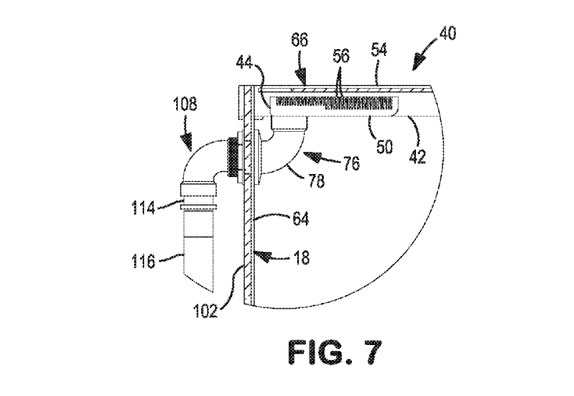
FIG. 7 is a side view of the overflow device positioned in an aquarium tank between the lid and the bottom edge of the frame.

The overflow system 38 is designed to safely and efficiently route the fluid (water) 12 from the aquarium tank 10 to the second (sump) tank 120. The overflow device 40 is extremely quiet, has a high quantity of skimming surface to provide aeration, maintains a consistent water height in the aquarium tank 10, displaces a very small amount of fluid (water) 12, and has a minimal footprint so as to stay out of sight and out of the way of lighting fixtures. The primary function of the overflow device 40 is to prevent large debris from getting into the second tank 120.

Figure 8:
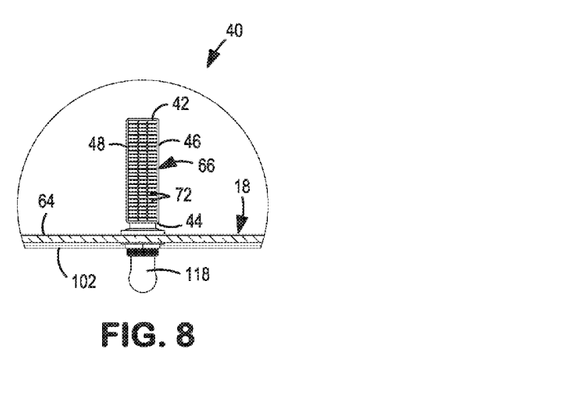
FIG. 8 is a top view of the overflow device aligned perpendicular to the sidewall of the aquarium tank.

Referring now to FIG. 8, when the overflow device 40 has a length of about 8 inches and a width of about 2.5 inches, the plurality of slots 56 will be present along about 7.5 inches of each of the first and second sidewalls, 46 and 48 respectively, and will be present along about 1.75 inches of both the front wall 42 and the back wall 44. This equates to about 17.5 linear inches of skimming capacity. In addition, as the fluid (water) line 14 in the aquarium tank 10 rises, more and more fluid (water) 12 will be able to flow through the plurality of slots 56 because each tapered slot 56 creates a greater size opening. This means that the plurality of slots 56 can accommodate different flow rates into the aquarium tank 10. This is one of the unique features of this overflow system 38.

Figure 11:
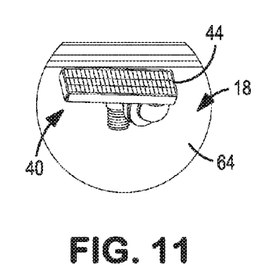
FIG. 11 is a perspective view showing the overflow device positioned 90° to the left of center.
Figure 12:
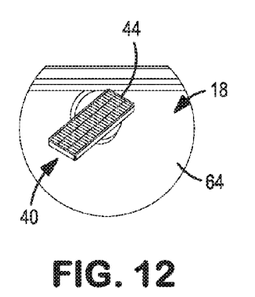
FIG. 12 is a perspective view showing the overflow device positioned 45° to the left of center.
Figure 13:
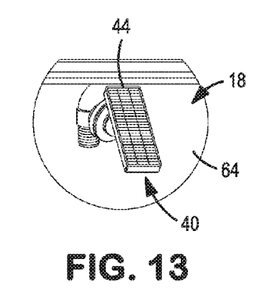
FIG. 13 is a perspective view showing the overflow device centered relative to the sidewall of the aquarium tank.
Figure 14:
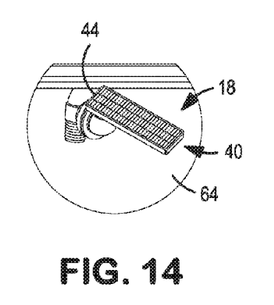
FIG. 14 is a perspective view showing the overflow device positioned 45° to the right of center.
Figure 15:
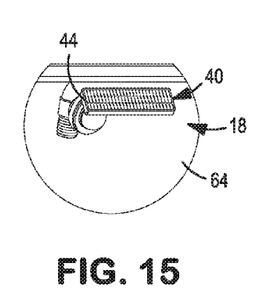
FIG. 15 is a perspective view showing the overflow device positioned 90° to the right of center.

Referring now to FIGS. 11-15, the overflow device 40 lends itself to many different installation orientations. Whether the goal is to manipulate the circulation and direction of fluid (water) 12 flow in the aquarium tank 10, to keep the overflow device 40 out of the way of the aquarium lights, or to be less visible within the aquarium tank 10, this is all possible. The overflow device 40 can be oriented in several different positions relative to one of the sidewalls 18. Starting with FIG. 13, the overflow device 40 is positioned with the back wall 44 aligned parallel to the inside surface 64 of the sidewall 18 of the aquarium tank 10. The sidewall 18 is the one that includes the first aperture 74. This is referred to as the "center position" in that the overflow device 40 is aligned perpendicular to the inside surface 64 of the side wall 18. In FIG. 11, the overflow device 40 is positioned with the back wall 44 aligned 90° to the left of center. In FIG. 12, the overflow device 40 is positioned with the back wall 44 aligned 45° to the left of center. In FIG. 14, the overflow device 40 is positioned with the back wall 44 aligned 45° to the right of center. Lastly, in FIG. 15, the overflow device 40 is positioned with the back wall 44 aligned 90° to the right of center.

It should be understood that the overflow device 40 can be positioned at these angles or any acute angle therebetween. Once a desired orientation of the overflow device 40 has been established relative to the sidewall 18, the first end 80 of the first elbow 78 can be securely joined to the collar 84. This securement can be formed by using an adhesive, glue, a chemical binder or a mechanical fastener. Those skilled in the art are well aware of different attachment methods that can be employed. Alternatively, a snug fit can be employed between the first end 80 of the first elbow 78 and the collar 84 since one does not have to worry about a leak since the first elbow 78 is located within the fluid (water) 12 present in the aquarium tank 10. However, a permanent securement is desired for most applications.

METHOD

A method of affixing the overflow system 38 to an aquarium tank 10 is also a part of this invention. The aquarium tank 10 is capable of holding a quantity of fluid (water) 12. The aquarium tank 10 has a bottom 16, at least one sidewall 18, and an open top 20 surrounded by a top edge 22. The aquarium tank 10 may also include a frame 24 having a horizontal member 26 which extends downward from the top edge 22 of the aquarium tank 10 along a portion of the at least one sidewall 18. The horizontal member 26 also has a bottom edge 28. The aquarium tank 10 will further have a lid 30 which closes off the open top 20 to limit evaporation of the fluid (water) 12.

The method includes the steps of positioning an overflow device 40 in the aquarium tank 10 between the lid 30 and the bottom edge 28 of the horizontal member 26 of the frame 24. The overflow device 40 has a front wall 42, a back wall 44, a first sidewall 46 and a second sidewall 48. All four walls 42, 44, 46 and 48 are secured to a bottom wall 50 and extend upward therefrom to create a chamber 52 having an open top 54. The front wall 42, the back wall 44, and the first and second sidewalls, 46 and 48 respectively, have a plurality of slots 56 formed therethrough. A portion of the plurality of slots 56 is disposed below the fluid (water) line 14 of the aquarium tank 10 so as to receive fluid (water) 12 from the aquarium tank 10 into the chamber 52. The bottom wall 50 of the overflow device 40 has an enlarged aperture 58 formed therethrough. An optional top screen 66 is removably attached to the overflow device 40 and covers the open top 20. The top screen 66 has a plurality of openings 72 formed therethrough.

The method also includes forming a first aperture 74 through the sidewall 18 of the aquarium tank 10. The first aperture 74 is positioned below the bottom edge 28 of the horizontal member 26 of the frame 24. The method further includes using an attachment mechanism 76 to attach the enlarged aperture formed in the bottom wall 50 of the overflow device 40 to the first aperture formed in the sidewall 18 of the aquarium tank 10. A portion of the attachment mechanism 76 passes through the first aperture 74. Lastly, the method can include using an optional conduit 118 to connect the attachment mechanism 76 to a second tank 120 whereby fluid (water) 12 can be drained from the aquarium tank 10 to the second tank 120. Other structures, not requiring the conduit 118 can also be used.

The method can further include changing the orientation of the overflow device 40 relative to the inside surface 64 of the sidewall 18 of the aquarium tank 10. The overflow device 40 can be positioned such that its back wall 44 is aligned at an acute angle to the sidewall 18 of the aquarium tank 10 which contains the first aperture 74. Desirably, the back wall 44 of the overflow device 40 is aligned parallel to the inside surface 64 of the sidewall 18 which contains the first aperture 74. The back wall 44 of the overflow device 40 can also be aligned at an angle of from between 0° to 90° relative to the sidewall 18 which contains the first aperture 74. By changing the orientation of the overflow device 40 relative to the sidewall 18 which contains the first aperture 74, one can install a light in the lid 30 of the aquarium tank 10 and position the overflow device 40 to be out of the way of this light. Furthermore, by changing the orientation of the overflow device 40 one can alter or manipulate the circulation and fluid flow in the aquarium tank 10.

The method further includes injection molding the overflow device 40.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A method of affixing an overflow system to an aquarium tank, said aquarium tank capable of holding a quantity of water and having a bottom, at least one sidewall, an open top surrounded by a top edge, a frame including a horizontal member which extends downward from said top edge along a portion of said at least one sidewall and has a bottom edge, and a lid which closes off said open top of said aquarium tank, said method comprising the steps of:
    a) positioning an overflow device in said aquarium tank between said lid and said bottom edge of said horizontal member, said overflow device having a front wall, a back wall, a first sidewall and a second sidewall all secured to a bottom wall and extending upward therefrom to create a chamber having an open top, said front wall, back wall, and said first and second sidewalls having a plurality of slots formed therethrough, a portion of said plurality of slots disposed below the water line of said aquarium tank so as to receive water from said aquarium tank into said chamber, and said bottom wall having an enlarged aperture formed therethrough;
    b) forming a first aperture through said sidewall of said aquarium tank, said first aperture positioned below said bottom edge of said horizontal member; and
    c) using an attachment mechanism to attach said enlarged aperture formed in said bottom wall of said overflow device to said first aperture formed in said sidewall of said aquarium tank, with a portion of said attachment mechanism passing through said first aperture.

2. The method of claim 1 further comprising changing the orientation of said overflow device so that said back wall of said overflow device is aligned at an acute angle to said sidewall of said aquarium tank which contains said first aperture.

3. The method of claim 1 further comprising installing a light in said lid and positioning said overflow device out of the way of said light.

4. The method of claim 1 further comprising removably attaching a top screen to said overflow device which covers said open top, said top screen having a plurality of openings formed therethrough.

5. The method of claim 1 further comprising using a conduit to connect said attachment mechanism to a second tank whereby water can be drained from said aquarium tank to said second tank.

6. The method of claim 2 further comprising aligning said back wall of said overflow device parallel to said inside surface of said sidewall of said aquarium tank.

7. The method of claim 2 further comprising aligning said back wall of said overflow device at an angle of from between 0° to 90° relative to said sidewall of said aquarium tank.

8. The method of claim 1 further comprising injection molding said overflow device.

9. A method of affixing an overflow system to an aquarium tank, said aquarium tank capable of holding a quantity of water and having a bottom, at least three sidewalls, an open top surrounded by a top edge, a frame including a horizontal member which extends downward from said top edge along a portion of said at least one sidewall and has a bottom edge, and a lid which closes off said open top of said aquarium tank, said method comprising the steps of:
    a) positioning an overflow device in said aquarium tank between said lid and said bottom edge of said horizontal member, said overflow device having a front wall, a back wall, a first sidewall and a second sidewall all secured to a bottom wall and extending upward therefrom to create a chamber having an open top, said front wall, back wall, and said first and second sidewalls having a plurality of slots formed therethrough, a portion of said plurality of slots disposed below the water line of said aquarium tank so as to receive water from said aquarium tank into said chamber, and said bottom wall having an enlarged aperture formed therethrough;
    b) forming a first aperture through one of said at least three sidewalls of said aquarium tank, said first aperture positioned below said bottom edge of said horizontal member and said first aperture having diameter of about 1 inch or more; and
    c) using an attachment mechanism to attach said enlarged aperture formed in said bottom wall of said overflow device to said first aperture formed in said sidewall of said aquarium tank, a portion of said attachment mechanism passing through said first aperture.

10. The method of claim 9 further comprising changing the orientation of said overflow device so that said back wall of said overflow device is aligned at an acute angle to said sidewall of said aquarium tank which contains said first aperture.

11. The method of claim 9 further comprising installing a light in said lid and positioning said overflow device out of the way of said light.

12. The method of claim 9 further comprising removably attaching a top screen to said overflow device which covers said open top, said top screen having a plurality of openings formed therethrough.

13. The method of claim 9 further comprising using a conduit to connect said attachment mechanism to a second tank whereby water can be drained from said aquarium tank to said second tank.

14. The method of claim 9 wherein said first aperture is positioned at least about 1.5 inches below said horizontal member of said frame.

15. A method of affixing an overflow system to an aquarium tank, said aquarium tank capable of holding a quantity of water and having a bottom, at least four sidewalls, an open top surrounded by a top edge, a frame including a horizontal member which extends downward from said top edge along a portion of said at least one sidewall and has a bottom edge, and a lid which closes off said open top of said aquarium tank, said method comprising the steps of:

a) positioning an overflow device in said aquarium tank between said lid and said bottom edge of said horizontal member, said overflow device having a front wall, a back wall, a first sidewall and a second sidewall all secured to a bottom wall and extending upward therefrom to create a chamber having an open top, said front wall, back wall, and said first and second sidewalls having a plurality of slots formed therethrough, a portion of said plurality of slots disposed below the water line of said aquarium tank so as to receive water from said aquarium tank into said chamber, and said bottom wall having an enlarged aperture formed therethrough;

b) forming a first aperture through one of said at least four sidewalls of said aquarium tank, said first aperture positioned below said bottom edge of said horizontal member; and c) using an attachment mechanism to attach said enlarged aperture formed in said bottom wall of said overflow device to said first aperture formed in said sidewall of said aquarium tank, a portion of said attachment mechanism passing through said first aperture.

16. The method of claim 15 further comprising changing the orientation of said overflow device so that said back wall of said overflow device is aligned at an acute angle to said sidewall of said aquarium tank which contains said first aperture.

17. The method of claim 15 further comprising installing a light in said lid and positioning said overflow device out of the way of said light.

18. The method of claim 15 further comprising removably attaching a top screen to said overflow device which covers said open top, said top screen having a plurality of openings formed therethrough.

19. The method of claim 15 further comprising using a conduit to connect said attachment mechanism to a second tank whereby water can be drained from said aquarium tank to said second tank.

20. The method of claim 16 wherein said first aperture has a diameter of about 1 inch or more.

* * * * *